United States Patent [19]

Yoshii et al.

[11] Patent Number: 5,102,186
[45] Date of Patent: Apr. 7, 1992

[54] REAR DECK STRUCTURE OF A CAR BODY

[75] Inventors: Noboru Yoshii; Shuichi Nakagami, both of Hiroshima, Japan

[73] Assignee: Mazda Motor Corporation, Japan

[21] Appl. No.: 522,955

[22] Filed: May 14, 1990

[30] Foreign Application Priority Data

May 15, 1989 [JP] Japan .................................. 1-54424

[51] Int. Cl.$^5$ .......................................... B62D 25/08
[52] U.S. Cl. .................................. 296/195; 296/203
[58] Field of Search ............ 296/195, 203, 76, 37.16, 296/198

[56] References Cited

U.S. PATENT DOCUMENTS

| | | | |
|---|---|---|---|
| 3,661,419 | 5/1972 | Mitamura et al. | 296/195 |
| 4,234,225 | 11/1980 | Harasaki et al. | 296/185 |
| 4,351,559 | 9/1982 | Sugisawa | 296/195 |
| 4,408,794 | 10/1983 | Harasaki | 296/195 |
| 4,634,174 | 1/1987 | Kamiya | 296/195 |
| 4,950,025 | 8/1990 | Yoshii | 296/195 |

FOREIGN PATENT DOCUMENTS

| | | | |
|---|---|---|---|
| 0136573 | 8/1983 | Japan | 296/203 |
| 0186782 | 10/1984 | Japan | 296/195 |
| 61-117066 | 7/1986 | Japan | |
| 61-163780 | 10/1986 | Japan | |
| 0034835 | 2/1987 | Japan | 296/195 |
| 0297381 | 11/1987 | Japan | 296/195 |
| 0235176 | 9/1988 | Japan | 296/195 |
| 0235177 | 9/1988 | Japan | 296/195 |
| 0009082 | 1/1989 | Japan | 296/203 |
| 0186481 | 7/1989 | Japan | 296/195 |
| 0244985 | 9/1989 | Japan | 296/195 |

*Primary Examiner*—Dennis H. Pedder

[57] ABSTRACT

A rear deck structure of a car body for partly supporting a rear window glass element and connecting right and left rear side walls of a car body includes a rear deck member with a hollow flange section extending from the right side wall to the left side wall of the car body. The rear deck member is connected to each suspension tower at each end of the hollow flange section with the hollow flange section secured, either directly or through a connecting member, to a rear surface of the suspension tower.

6 Claims, 7 Drawing Sheets

REAR DECK STRUCTURE OF A CAR BODY

The present invention relates to a rear deck structure of a car body.

BACKGROUND OF THE INVENTION

A car body typically has a rear deck member which extends in a direction of the width of the car body. The rear deck member usually supports the lower edge of a rear window glass element. Both lateral ends of the rear deck member are connected or welded to suspension towers, which receive and mount struts of rear suspensions, so as to increase the rigidity of the rear part of the car body. However, in certain rear deck structures, such as that disclosed in, for example, Japanese Unexamined Utility Model publication No. 61-117066, entitled "Rear Body Structure of a Passenger Car," laid open on July 24, 1986, the rear deck member is attached to the uppermost surface of the suspension tower and, accordingly, is subjected to vertical forces from the strut. Such a connecting structure results in insufficient connecting rigidity between the rear deck member and the suspension tower.

SUMMARY OF THE INVENTION

It is, therefore, an object of the present invention to provide a rear deck structure of a car body in which a high connective rigidity is obtained between a rear deck member and rear suspension towers.

This object is achieved by providing a rear deck structure of a car body having right and left side walls forming part of a rear portion of the car body, and right and left suspension towers secured to the right and left car body side walls, respectively, for supporting right and left suspensions. The rear deck structure includes a rear deck member with a hollow flange section extending from the right side wall to the left side wall for supporting part of a rear window glass element and connecting the right and left rear side walls of the car body. The rear deck member is connected, directly or through a connecting member, to each suspension tower at or near each end of the hollow flange section.

In one particular embodiment of the present invention, the hollow flange section comprises a generally U-channel shaped flange formed in the rear deck member, and a reinforcement secured to the flange to close the channel opening of the U-channel shaped flange.

Because of the connection between the rear deck member and the rear surface of the suspension tower at or near each end of the hollow flange section, vertical and/or twisting forces transmitted from a car wheel to a suspension act on the rear deck member, and particularly on the hollow flange section of the rear deck member, in a direction such that the rear deck member is subjected to shear forces. A high connective rigidity between the rear deck member and the suspension tower is provided so as to contribute to or increase the rigidity of rear car body.

BRIEF DESCRIPTION OF THE DRAWINGS

The foregoing and other objects, features and advantages of the present invention will be understood more clearly and fully from the following detailed description of the preferred embodiment thereof with reference to the accompanying drawings, in which like reference numerals have been used in different figures to denote the same parts in structure and operation, and wherein.

DETAILED DESCRIPTION OF THE PREFERRED EMBODIMENT

Because rear deck structures are well known, the present description will be directed in particular to elements forming parts of, or cooperating with, the novel structure in accordance with the present invention. It is to be understood that elements not specifically shown or described can take various forms well known to those skilled in the vehicle art.

It should be noted that the words "inner" and "outer" designate directions oriented toward an inside and an outside of the vehicle, respectively.

Figure 1:
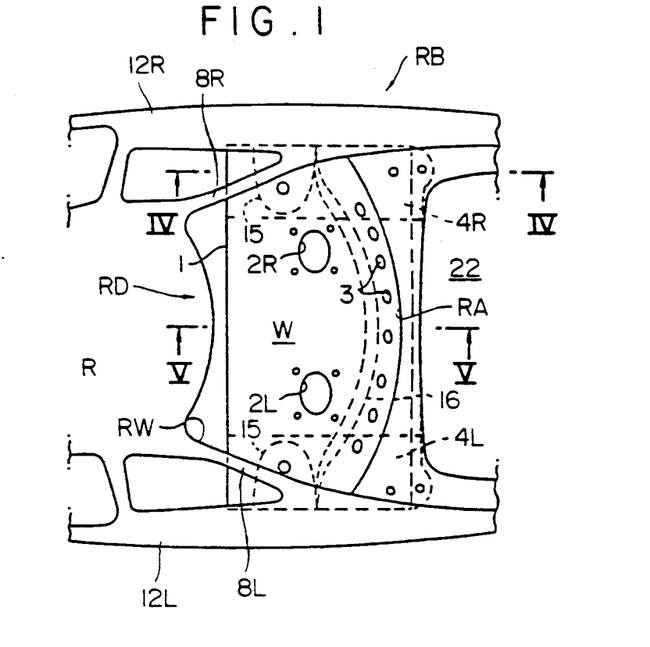
FIG. 1 is a schematic plan view partly showing a car body in which the present invention is embodied.

Before describing the present invention in detail, reference is made to FIG. 1 for the purpose of providing a brief description of a rear body of a vehicle that will enhance an understanding of the rear deck structure according to the present invention. In the rear body section RB of a car body, substantially horizontally provided behind a rear passenger seat (not shown) is a rear deck structure or member RD including a rear package panel 1 with right and left side speaker holes 2R and 2L formed therein. A rear window opening RW is defined by left and right rear pillars 8L and 8R extending forwardly up from right and left rear fenders 12R and 12L and extending inwardly up to a roof R from a rear window glass support RA. A rear window glass element W is fitted in the rear window opening RW.

Because the right and left halves of the rear deck structure RD of the rear body section RB of the vehicle are structurally identical and symmetrical, the following description will be given for the right half of the rear deck structure RD only. As is shown in FIGS. 2 to 6 in more detail, the rear window glass support RA is divided into two parts, namely, a main support section formed integrally with a rear package panel 1 and end support sections 30A formed integrally with right and left rear corner panels 30 partially forming part of the rear deck structure RD, respectively.

The main support section of the rear window glass support RA integral with the rear package panel 1 is shaped in such a way to form, in order from the front edge of the rear package panel 1, a channel-shaped flange 1A with its channel opening facing down and a channel-shaped apron 1B with its channel opening facing up. The channel-shaped apron 1B has a width which gradually becomes wider toward each of its outer ends. Each end support section 30A of the rear window glass support RA integral with the rear corner panel 30 is in the form of a channel-shaped flange with its channel opening facing down and is provided with a flat front apron 30C. The rear corner panel 30 further forms partial extension part 30B of the channel-shaped apron 1B of the main support section 1A of the rear window glass element support RA.

Figure 2:
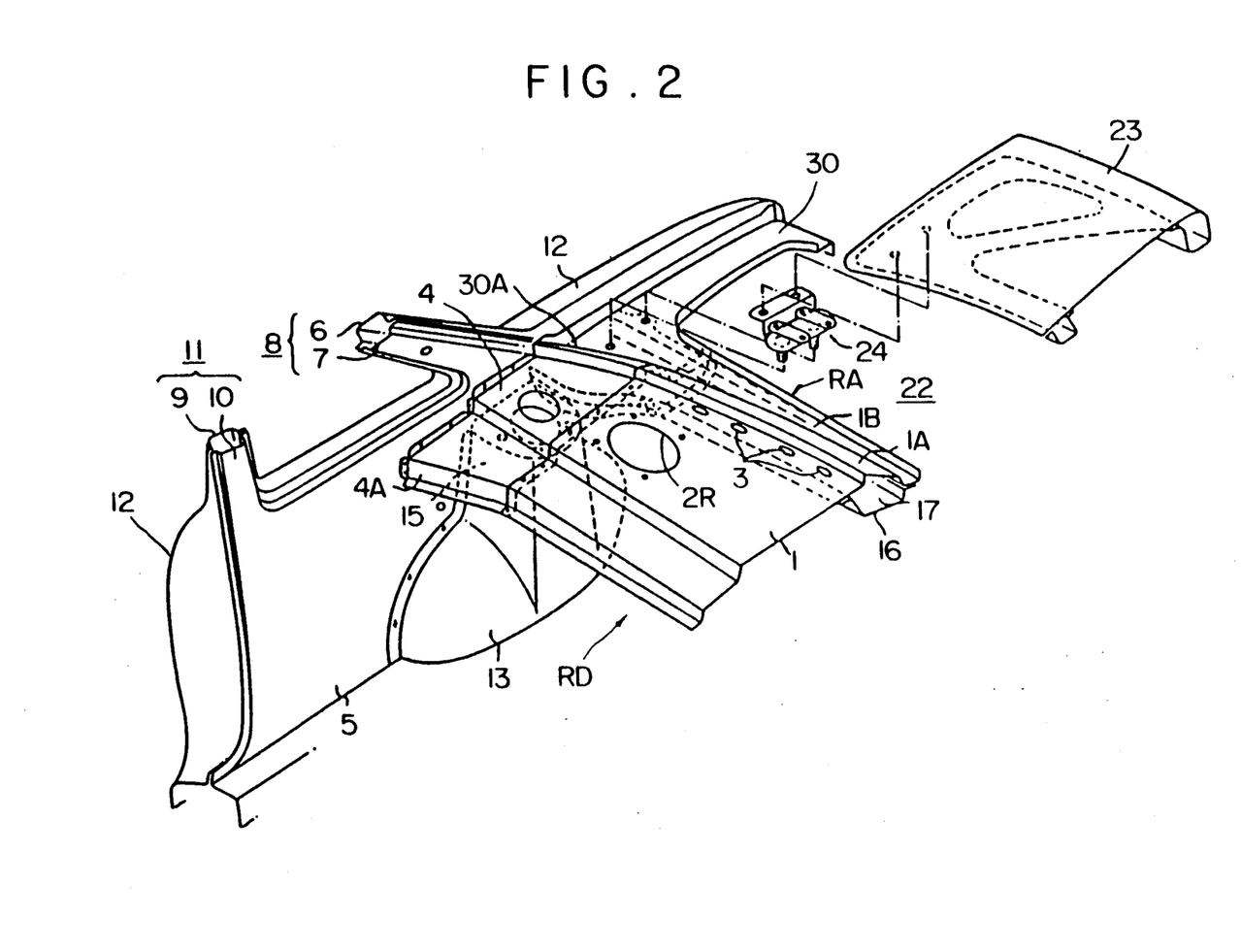
FIG. 2 is a perspective detailed illustration showing a rear body portion of the car body of FIG. 1.
Figure 3:
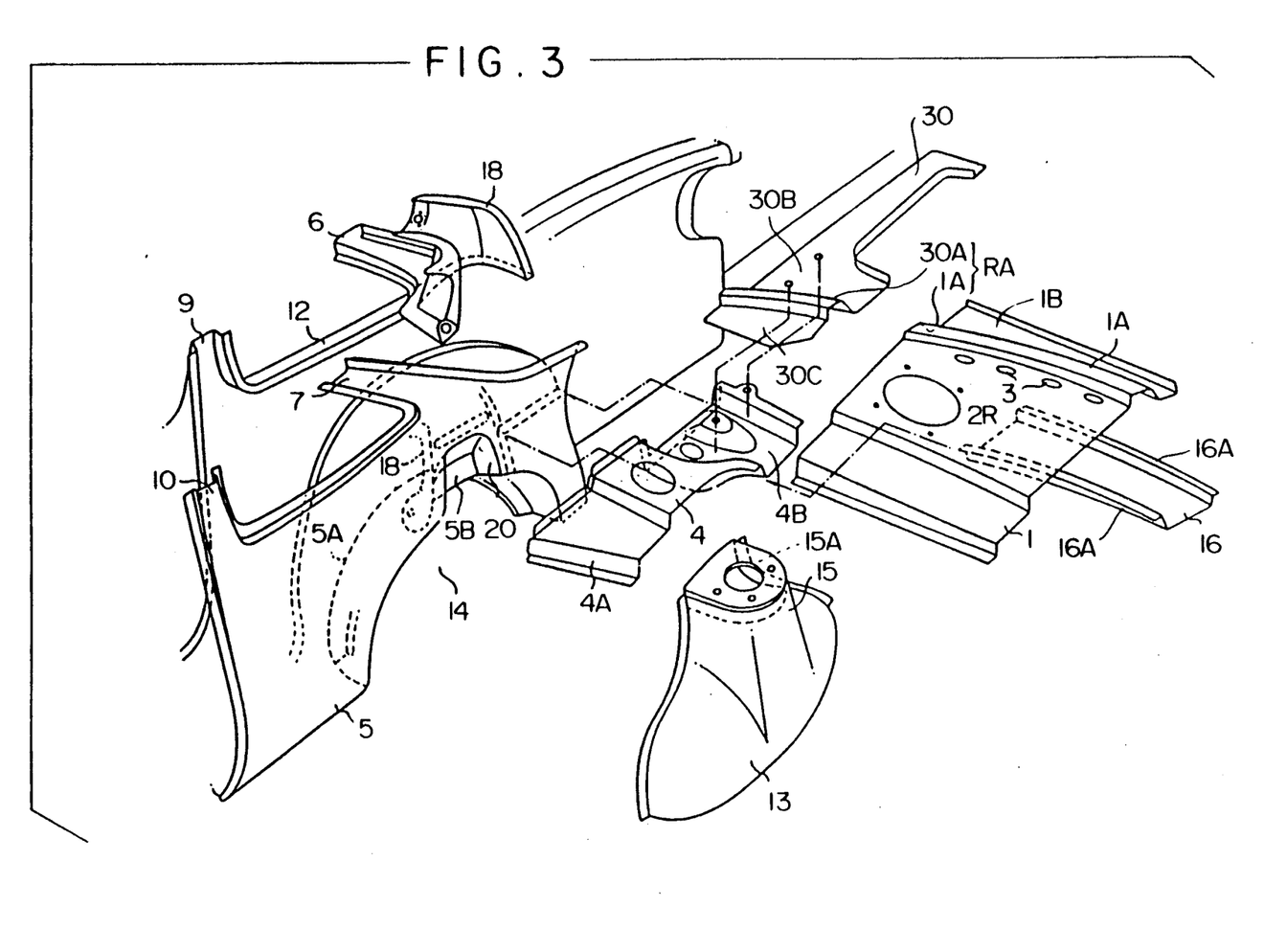
FIG. 3 is an exploded view showing the rear body portion of FIG. 2.

The rear package panel 1 is secured to right and left walls of the rear body section RB of the vehicle through right and left junction panels 4 forming part of the rear deck structure. Each junction panel 4 has a flat front apron 4A and a channel-shaped rear apron 4B with its channel facing up. Each junction panel 4 is bolted or welded to the under surface of the rear corner panel 30 with the channel-shaped rear apron 4B covered by the flat front apron 30C and extension part 30B so as to form an inner end thereof substantially identical in cross section with the outer end of the rear package panel 1. The junction panel 4 and rear corner panel 30 are, at their inner ends, partially overlapped on and secured or welded to the outer end of the rear package panel 1 and, at their outer ends, are secured or welded to a side wall of the rear body section RB at appropriate points. The junction panel 4 and rear corner panel 30 therefore rigidly connect the rear package panel 1 to the vehicle body. Practically, the right and left junction panels 4 and the right and left rear corner panels 30 are first secured or welded to right and left quarter panels 5 (FIG. 2 shows the right quarter panel only), respectively, and are then secured or welded to respective ends of the rear package panel 1. A lower edge of the rear window glass W is adhered to the back of the channel-shaped flanges 1B and 30A and supported by the channel-shaped aprons 1B and 30B of the rear package panel 1 and rear corner panel 30. Formed in the rear package panel 1 along the channel-shaped flange of the rear window glass support 1A is a row of air outlets 3 through which air is evacuated from the interior to the exterior of the vehicle.

An elongated channel-shaped rear package reinforcement 16 with its channel opening facing up and provided with a flat front flange 16A is secured or welded to the under surface of the rear package panel 1. The rear package reinforcement is also secured or welded to the inner end of the channel-shaped rear apron 4B of the junction panel 4. The channel-shaped rear apron 4B of the junction panel 4 thus secured to the channel-shaped rear package reinforcement 16 constitutes an end part of the channel-shaped rear package reinforcement 16. This rear package reinforcement 16 forms an elongated closed space 17 having an irregular, but substantially rectangular, cross-section and a width which gradually becomes wider toward the outside of the vehicle. The elongated closed space 17, to which the air outlets 3 open, serves as an exhaust duct for evacuating air from the vehicle.

Figure 4:
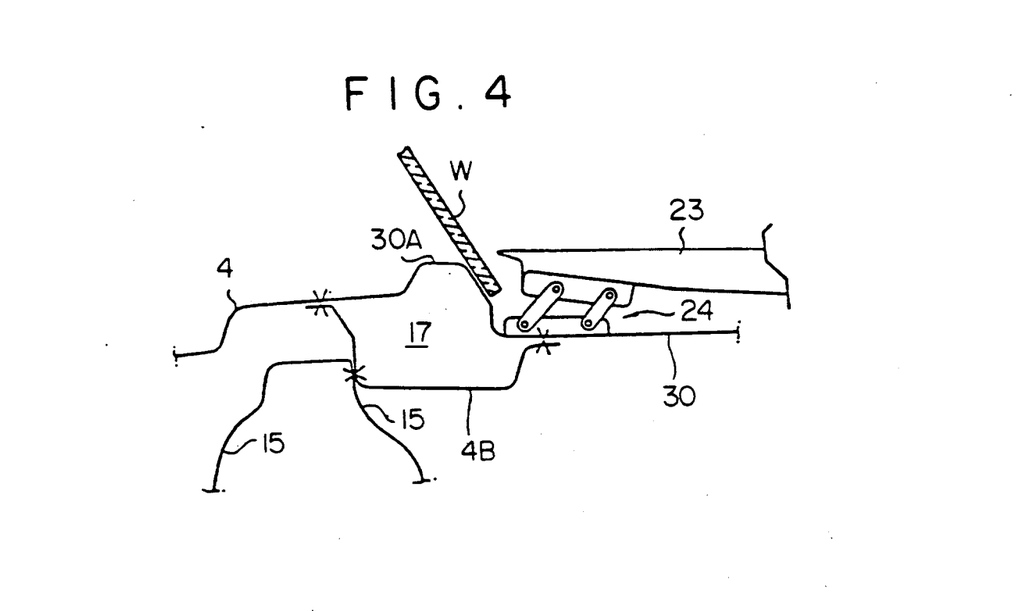
FIG. 4 is a cross sectional view taken along line IV—IV of FIG. 1.
Figure 5:
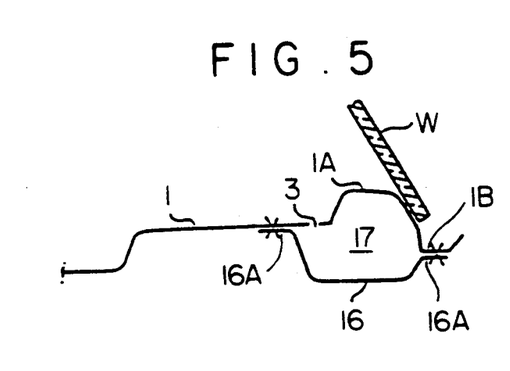
FIG. 5 is a cross sectional view taken along line V—V of FIG. 1.

The outer end of the rear package reinforcement 16, and in particular, the channel-shaped rear apron 4B serving as the end part of the rear package reinforcement 16, is rigidly secured or welded to a rear surface 15A of the suspension tower 15 as clearly shown in FIG. 4. Flange 1A, reinforcement 16, extension part 30B and rear apron 4B together form a hollow flange section of the rear deck structure RD.

Each side wall of the rear body section RB of the vehicle comprises an inner rear body wall or rear quarter panel 5 and an outer rear body wall or rear fender 12. The rear quarter panel 5 is integrally formed with channel-shaped inner pillar members 7 and 10 with their channel openings facing to the outside of the vehicle. The rear fender 12 is integrally formed with channel-shaped outer pillar members 6 and 9 with their channel openings both facing to the inside of the vehicle. These inner and outer pillar members 7 and 10, and 6 and 9 are welded to each other to form rear, and center or side hollow pillars 8 and 11, respectively.

The rear quarter panel 5 is formed with a generally quarter-spherical portion 5A (see FIG. 3), which expands toward the outside of the vehicle below the rear inner pillar member 7. A rear wheel housing member 13, which expands toward the inside of the vehicle and has a generally quarter-spherical shape, is secured or welded to the rear quarter panel 5 at appropriate points to form a rear wheel housing 14 between position 5A and member 13. Specifically, the rear wheel housing member 13 is integrally formed with a vertically upward extending hollow suspension tower 15. The suspension tower 15, as is well known in the art, receives a suspension strut 21 therein and supports an upper end of the suspension strut.

Figure 6:
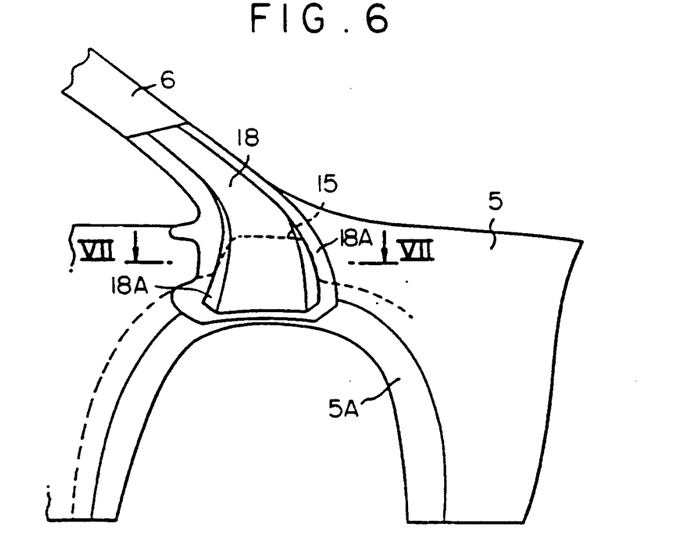
FIG. 6 is a view showing a reinforcement arrangement of the rear body portion of FIG. 2 as seen from the inside of the rear body portion.
Figure 7:
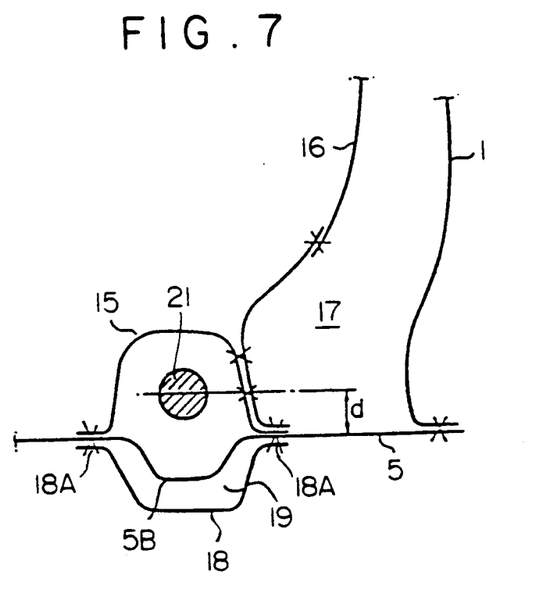
FIG. 7 is a cross sectional view taken along line VII—VII of FIG. 6.

The side wall of the rear body section RB forms a space between the rear quarter panel 5 and rear fender 12. As is shown in FIGS. 6 and 7, a reinforcement 18, integrally formed with front and rear flanges 18A, is located in the space formed in the side wall so as to vertically overlap the top end of the suspension tower 15 and extend upward, partly in the hollow rear pillar 8. This reinforcement 18 is secured to the rear body section RB by welding the flanges 18A to the outer surface of the rear quarter panel 5 and the quarter-spherical portion 5A of the rear quarter panel 5 forming part of the rear wheel housing 14, thereby forming a closed cross-section 19 between the rear quarter panel 5 and reinforcement 18. Because the reinforcement 18 extends into the rear pillar 8, a force transmitted vertically from the suspension tower to the rear body section RB is partly dispersed to the rear pillar 8 through the reinforcement 18. It is desirable to form an indentation 5B with its opening facing the reinforcement 18 in the rear quarter panel 5 to provide a space 20. The provision of space 20 not only increases the rigidity of the suspension tower 15 and improves assembly of the suspension strut 21 into the suspension tower 15 but also decreases an offset distance d between the suspension strut and the rear quarter panel 5.

As is seen in FIGS. 1 and 2, an opening 22 of a trunk cavity or room is formed in the rear body section RB defined by the rear edge of the rear package panel 1 and the inner edge of the rear corner panel 30. To swingably support for opening and closing a trunk lid 23 relative to the opening 22, link-type hinges 24 are bolted onto the right and left rear corner panels 30. The link-type hinge may take any type well known in the art.

Figure 8:
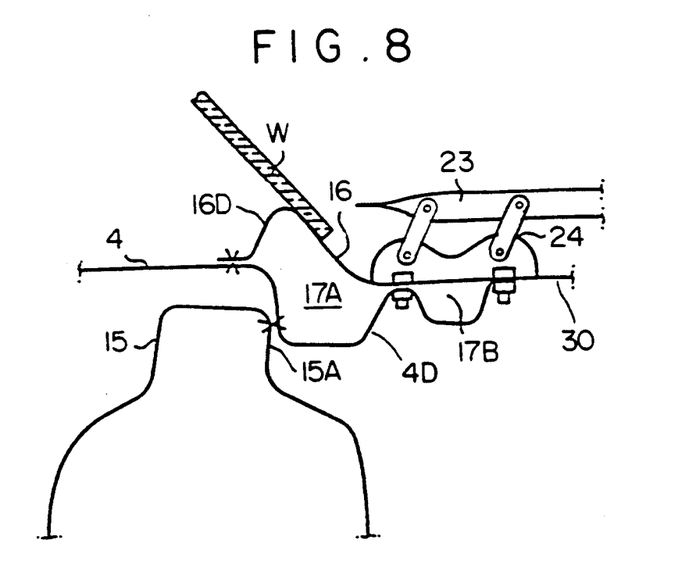
FIG. 8 is a cross sectional view, similar to FIG. 4, of a variant of the rear body portion of FIG. 2.
Figures 9A, 9B:
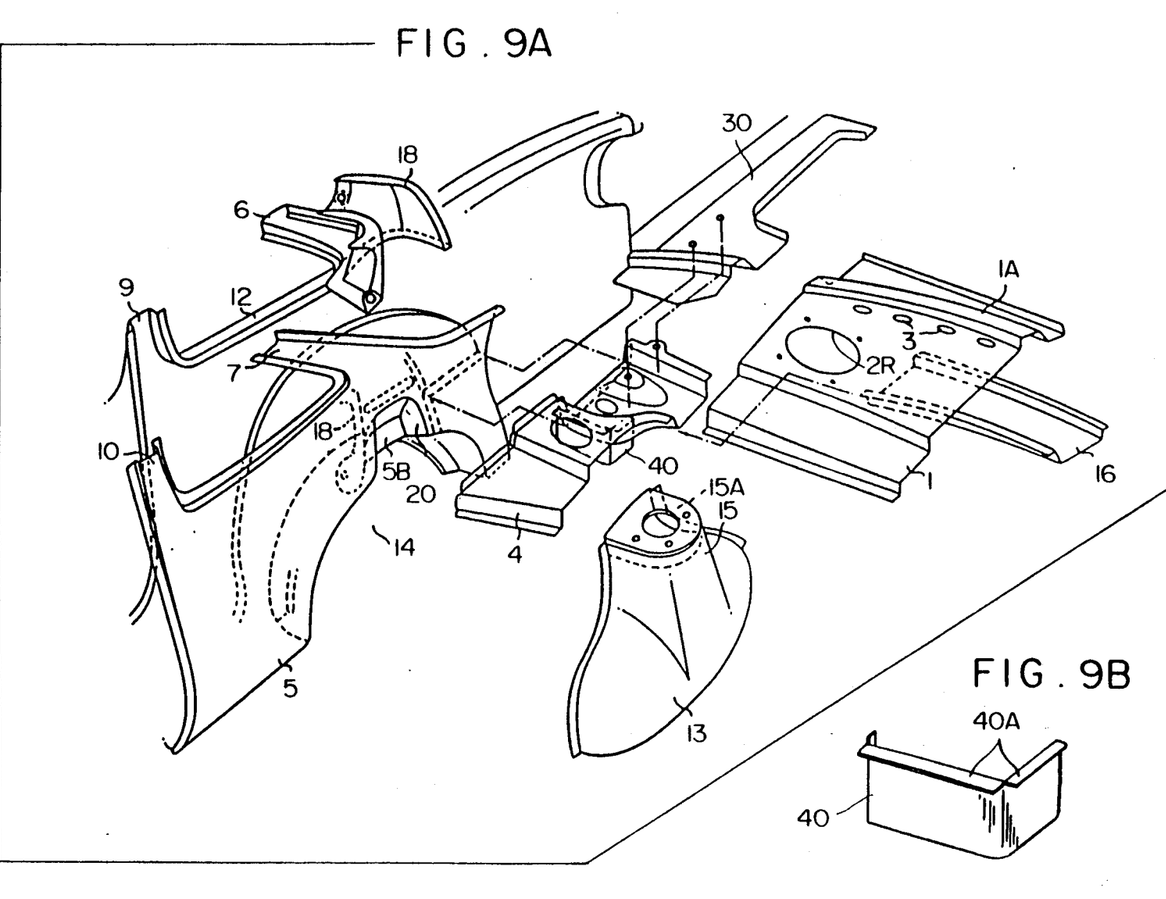
FIG. 9A is an exploded view, similar to FIG. 3, showing rear deck structure of a car body according to another preferred embodiment of the present invention.
FIG. 9B is a perspective view of a connecting member.
Figure 10:
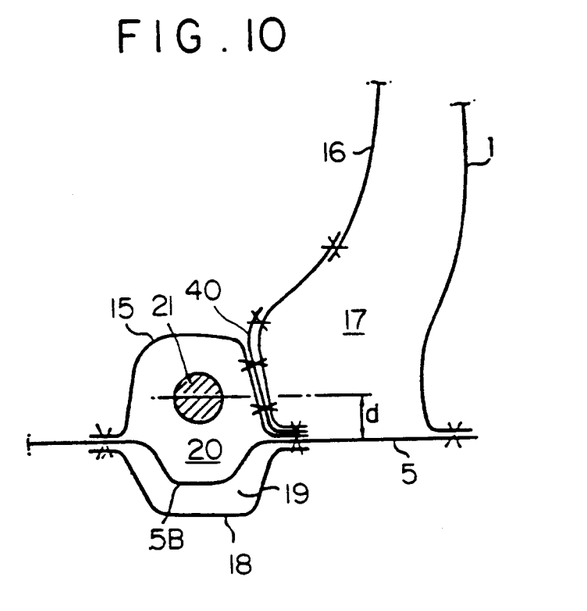
FIG. 10 is a cross sectional view, similar to FIG. 4, showing the rear deck structure of FIG. 9.
Figure 11:
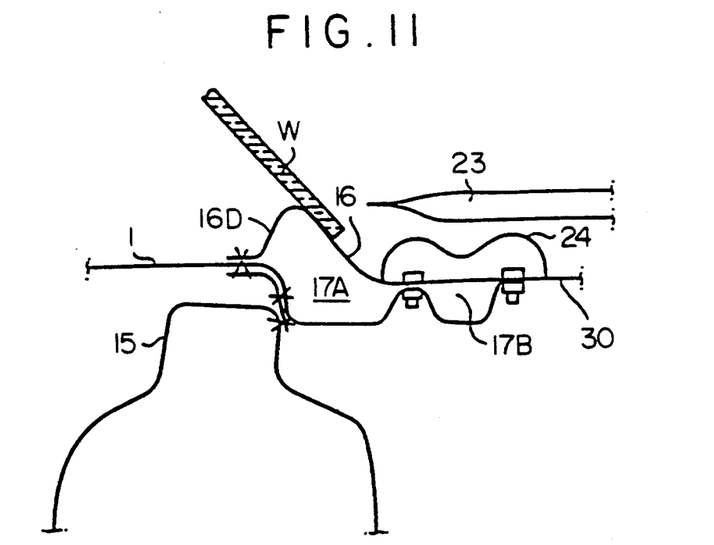
FIG. 11 is a cross sectional view, similar to FIG. 7, showing the rear deck structure of FIG. 9.

It is desirable to provide elongated parallel spaces 17A and 17B between the rear package reinforcement 16, and the rear package panel 1 and rear junction panel 4 in order to increase rigidity where the link-type hinge 24 is bolted to the rear corner panel 30. For example, in a construction in which the rear package panel 1 is formed at its rear end with a double channel-shaped flange (not shown) with openings facing up, the rear junction panel 4 is formed with a double channel-shaped rear apron 4D, as shown in FIG. 8. The rear apron 4D is covered by a rear package reinforcement 16 formed with a channel-shaped flange 16D with its channel opening facing down. The rear apron 4D is covered by the rear corner panel 30 to form the elongated parallel spaces 17A and 17B therebetween. In this embodiment, the front surface of the double channel-shaped rear apron 4D serves as end part of the double channel-shaped flange of the rear package panel 1, and is rigidly secured or welded to a rear surface 15A of the suspension tower 15. The rear window glass W is secured to the back of the channel-shaped flange 16D of the rear package reinforcement 16.

Referring to FIGS. 9A, 9B, 10 and 11, these figures show a rear deck structure of a rear car body section of a vehicle according to another preferred embodiment of the present invention which is, except for the addition of a connecting member for connecting the rear deck member to the suspension tower, almost identical in structure to the rear deck structure of the previous embodiment. In this embodiment, a connecting member 40 with an upper flange 40A is inserted between the rear deck member, in particular the junction panel 4, and the suspension tower 15 with the upper flange 40A welded to the under surface of the junction panel 4 and one side surface welded to the rear side surface of the suspension tower 15. In practice, for the purpose of easy assembly, the connecting member 40 is first welded to the junction panel 4. Thereafter, the junction panel 4 is secured or welded to the rear quarter panel 5 of the rear side wall and the suspension tower, and is attached to the rear package panel 1.

It is to be understood that although the invention has been described in detail with respect to particular embodiments, nevertheless, various other embodiments and variants are possible which are within the spirit and scope of the invention, and such are intended to be covered by the following claims.

What is claimed is:

1. A rear structure of a car body comprising:
right and left side walls forming part of a rear portion of said car body;
right and left suspension towers secured to said right and left side walls, respectively, for supporting right and left suspensions, respectively;
a rear deck member with a hollow flange section extending from said right side wall to said left side wall for supporting part of a rear window glass element, said rear deck member being secured to said suspension towers directly by having said hollow flange section directly secured to a rear surface of each suspension tower; and
means for connecting said rear deck member with said right and left side walls of said car body by securing said rear deck member to said suspension towers at opposite ends of said hollow flange section.

2. A rear structure of a car body comprising:
right and left side walls forming part of a rear portion of said car body;
right and left suspension towers secured to said right and left side walls, respectively, each of said right and left suspensions, respectively, each of said right and left suspension towers having rear, front and inner surfaces;
a rear deck member with a hollow flange section extending from said right side wall to said left side wall for supporting part of a rear window glass element;
means for connecting said rear deck member with said right and left side walls of said car body by securing said rear deck means to said suspension towers at opposite ends of said hollow flange section; and
a connecting member, said rear deck member being secured to said suspension towers by having said hollow flange section secured to the rear surface of each suspension tower through said connecting member, the rear surface of each of said right and left suspension towers forming a substantially vertical wall, said rear deck member having a substantially vertical wall, the vertical wall of said rear deck member being rigidly secured to the vertical wall of said right and left suspension towers.

3. A rear structure as defined in claim 2, and further comprising a rear trunk lid, and a hinge provided on said hollow flange section of said rear deck member for connecting said rear trunk lid to said hollow flange section.

4. A rear deck structure as defined in claim 3, wherein said rear deck member comprises: at least one rear package panel extending substantially between said right and left suspension towers, and right and left junction panels, each of said junction panels being secured between and to one end of said at least one rear package panel and one of said right and left side walls.

5. A rear structure as defined in claim 4, wherein said rear deck member further comprises right and left rear corner panels, each being secured between and to one end of said at least one rear package panel and one of said right and left side walls so as to form part of said hollow flange section.

6. A rear structure as defined in claim 2, wherein said rear deck member is secured to inner surfaces of said right and left side walls.

* * * * *